May 11, 1937.　　　W. S. GORTON　　　2,079,689
REPEATING STATION FOR OCEAN CABLES
Filed Jan. 12, 1933　　　2 Sheets-Sheet 1
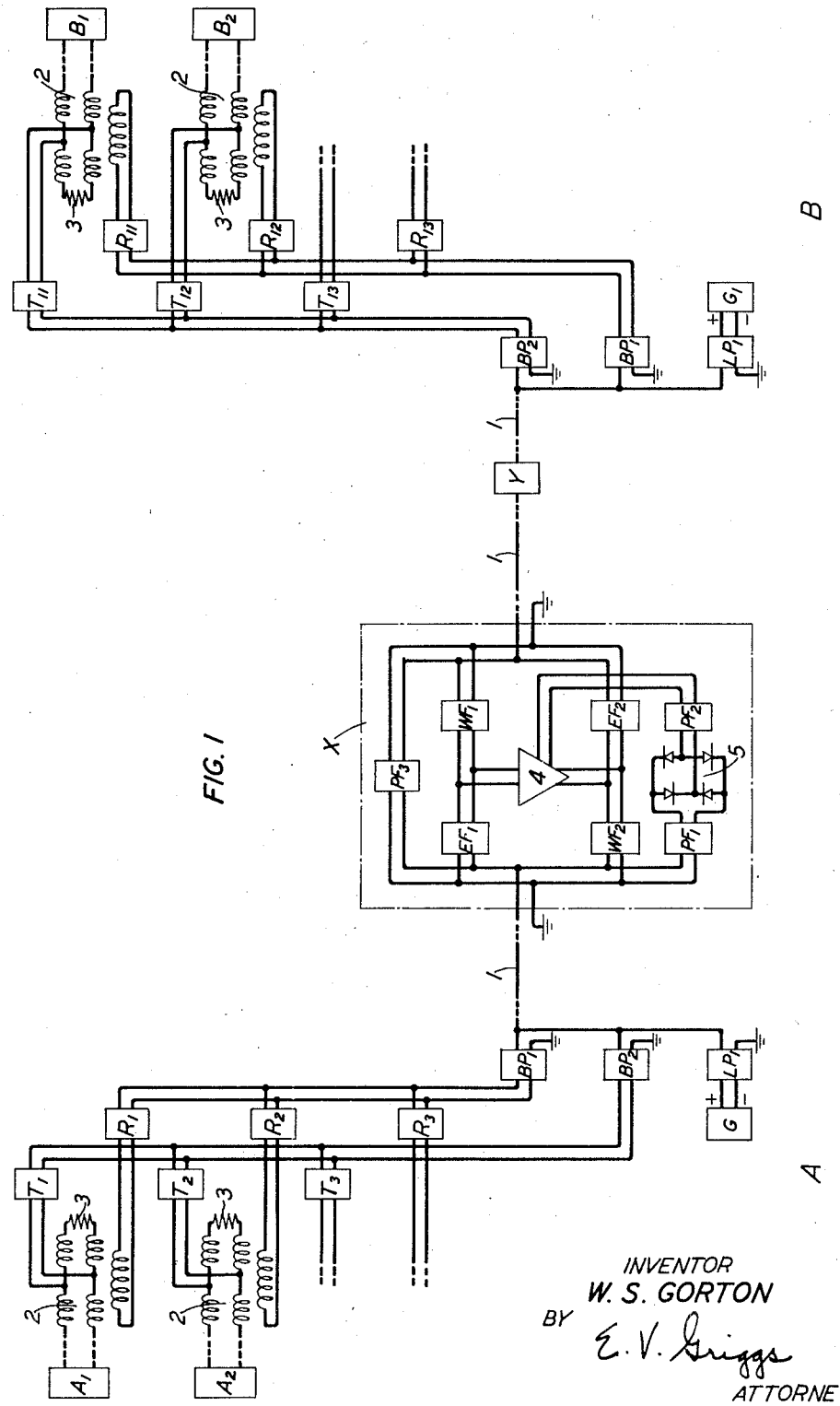
INVENTOR
W. S. GORTON
BY E. V. Griggs
ATTORNEY May 11, 1937.　　W. S. GORTON　　2,079,689
REPEATING STATION FOR OCEAN CABLES
Filed Jan. 12, 1933　　2 Sheets-Sheet 2
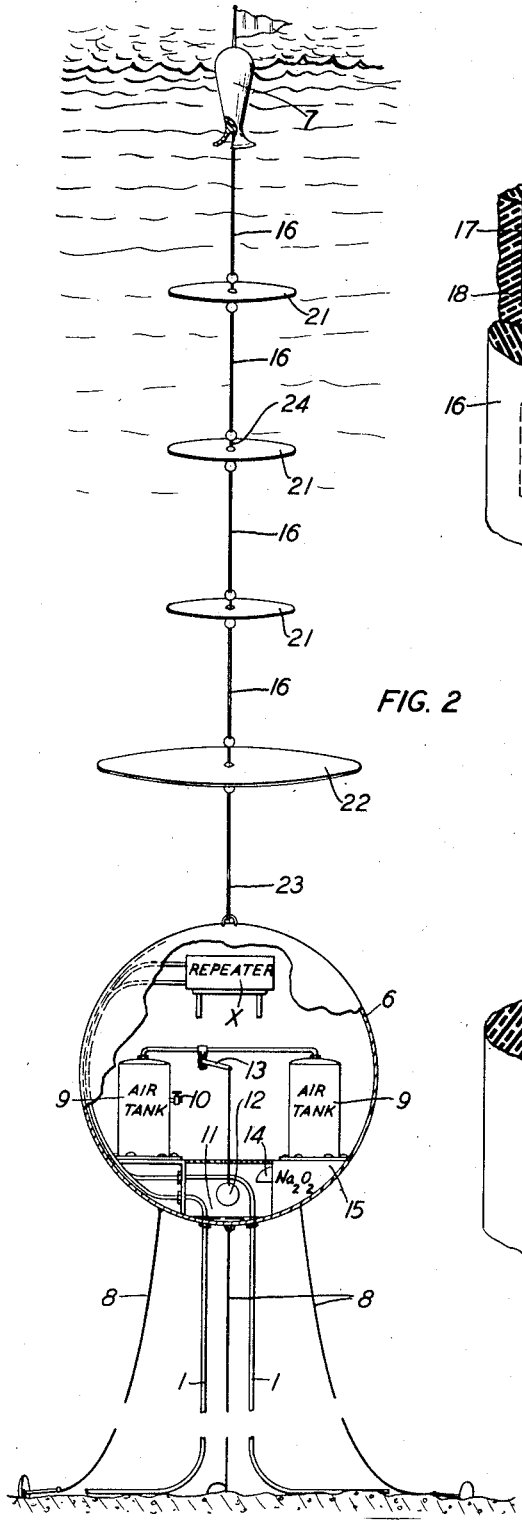
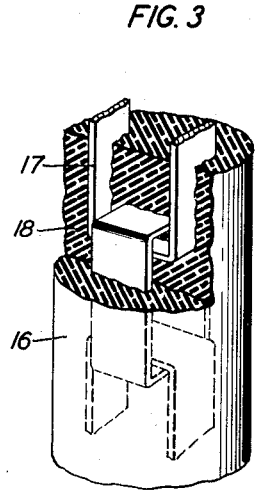
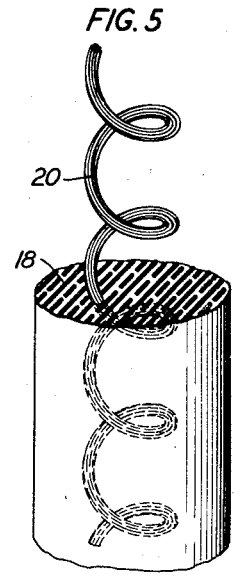
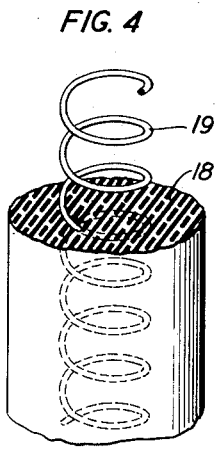
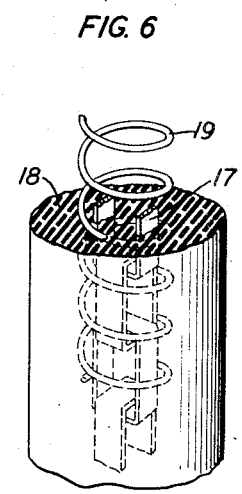
INVENTOR
W. S. GORTON
BY
E. V. Griggs
ATTORNEY Patented May 11, 1937

2,079,689

UNITED STATES PATENT OFFICE 2,079,689

REPEATING STATION FOR OCEAN CABLES

William S. Gorton, Maplewood, N. J., assignor to Bell Telephone Laboratories, Incorporated, New York, N. Y., a corporation of New York Application January 12, 1933, Serial No. 651,250

16 Claims. (Cl. 179—170)

This invention relates to repeating stations for ocean cables.

In accordance with the invention communication cables traversing the ocean are provided with repeating stations which divide the cable span as a whole into a number of sections. This effects important economies in the cable structure itself and also in the terminal apparatus because of the lower transmission levels which may be employed. To facilitate servicing the repeater and at the same time to avoid the difficulties encountered at the surface of the sea because of its incessant motion and at the bottom of the sea because of its high pressure, the repeater station is maintained submerged in a zone of relatively quiet water at comparatively low pressure.

It has previously been proposed (German Patent 505,625) to attain a somewhat similar result by anchoring a buoy repeater station to the bottom of the sea. That plan is open to the serious objection that ocean currents cause the repeater station to drift and force the anchoring cable to depart from a normal vertical position, thus producing a depression of the repeater station which, in deep water, may amount to many hundred feet. As each additional foot in depth increases the static sea pressure by approximately ½ lb. per square inch such a variation in depth is a serious matter. To overcome this difficulty the repeater station with its attached communication cable connections is made a little heavier than its water displacement so that it tends to sink. The station is connected to a surface buoy supporting it by means of an extensible cable which functions to substantially eliminate the effect of variations in the position of the buoy at the sea surface. This buoy is of such size as to not only support the repeater station but in addition afford a large reserve buoyancy.

The invention may best be understood by reference to the accompanying drawings in which Fig. 1 illustrates schematically the circuit connections of an ocean communication system. Fig. 2 indicates diagrammatically certain mechanical details of a repeater station. Figs. 3, 4, 5, and 6 show details of alternative forms of an extensible supporting cable.

Referring to Fig. 1, a shore terminal station A with its associated subscribers' stations $A_1$, $A_2$ is shown connected to a second short station B with associated subscribers' stations $B_1$, $B_2$ through cable sections $l$ and intermediate repeater stations X, Y. The series of subscribers' stations $A_1$, $A_2$, are, through their respective subscribers' circuits and central office connections (not shown), associated with carrier wave transmiting and receiving apparatus at the station A. Similarly, subscribers' stations $B_1$ and $B_2$ are associated by their respective subscribers' circuits with carrier transmission apparatus at shore station B. One of the channels may operate at ordinary voice frequency.

The apparatus at station A comprises the usual hybrid coil 2 and balancing network 3 associated with the line leading to the subscriber's station, carrier wave transmitting apparatus $T_1$ and receiving apparatus $R_1$ and the directional band pass filters $BP_1$ for receiving and $BP_2$ for transmitting. This apparatus may preferably be of the type disclosed in connection with Figs. 2 and 3 of the article entitled "Carrier systems on long distance telephone lines" by Affel and Demarest, published in the Bell System Technical Journal, vol. 7, pages 564 to 629, July, 1928. It is to be understood that the subscribers' stations $A_1$, $A_2$ may be connected for communication over the ocean cable system with stations $B_1$ and $B_2$, respectively. The operation of the carrier wave apparatus including the directional filters is well understood in the art.

In order to supply energy to the amplifier at the submerged repeater station there is associated with the shore station A a source of current G which is also connected to the cable $l$ through a low pass filter $LP_1$ which will freely transmit unidirectional current or low frequency power currents and at the same time suppress all ripples or harmonics lying within the range of the essential communication frequencies to be transmitted. A similar source $G_1$ may be associated with the remote shore station B. If the power supply paths for the various repeaters are connected effectively in parallel each with a ground return path through its respective power supply filter $PF_1$ as shown at repeating station A, the sources G and $G_1$ will be similarly poled with respect to ground so as to operate in parallel.

In view of the remoteness of the station from shore and its relative inaccessibility, it is essential that the amplifying apparatus be of extremely stable character over considerable periods of time. The amplifying apparatus preferably is of the type disclosed in Fig. 66 of H. S. Black application, Serial No. 606,871 filed April 22, 1932. The location of the repeater also makes it essential that any vacuum tubes employed have minimum power requirements. Repeater X serves to transmit in one direction a band of frequencies of sufficient extent to include all of the messages being transmitted in that direction and to transmit in the opposite direction a non-overlapping band of frequencies of equal band width. For example, the band transmitted in the west pointing channel comprising the filter WF₁, amplifying apparatus 4 and filter WF₂ may range from 250 to 13,250 cycles and that in the east pointing channel comprising filter EF₁, amplifier 4 and filter EF₂ from 18,000 to approximately 31,000 cycles. Filters EF₁, EF₂ WF₁, and WF₂ may include or have associated therewith suitable attenuation equalizing networks to enable each repeater to pass undistorted waves to the cable sections associated with its output circuit.

Power currents for energizing vacuum tubes of the amplifier transmitted from the source G at terminal station A will fall within the range of frequencies lying below 250 cycles. The power currents reaching the repeating station X traverse a path including power filter PF₁ which freely transmits currents within the essential range of power frequencies lying below 250 cycles but excludes currents of higher frequencies. Associated with the power filter PF₁ is a rectifying system 5 comprising four copper oxide or other similar rectifying devices assembled in the well-known Graetz arrangement to function as a full wave rectifier. The output circuit of the rectifier 5 is connected to the amplifier 4 through a ripple suppressing filter PF₂ of well-known type. Inasmuch as it is necessary to permit power current to pass on to the next outlying repeater station, there is also provided a shunt path including filter PF₃ which permits power currents and uni-directional current for testing purposes to pass around the repeater station to the next cable section 1. Filters LP₁, PF₁ and PF₃ may have a transmission range extending from 0 to 100 cycles.

It will be readily understood that, if desired, the sources G and G₁ may be so poled as to operate in series in which case the power supply paths of the various repeaters X, Y, etc., will be ungrounded, the power filter PF₁ at each repeating station being connected in the series path which includes the filter PF₃.

In some instances as, for example, at the stations most remote from shore it may be desirable to furnish energy to the vacuum tubes from local batteries. As weight is a vital factor such batteries should be designed with a view to maximum ratio of output energy to weight. A suitable cell for such apparatus is the "air-cell" battery manufactured by the National Carbon Company.

It should be understood, however, that the whole system may be supplied with current from batteries, each in the housing with its repeater, or by power supplied from the ends of the cable or by any combination of batteries and exernally supplied power.

The energy for the repeater tubes may be supplied as uni-directional current at a voltage of the order of 1000 volts. In that event the device G is a source of uni-directional current. If uni-directional current is employed any possible electrolytic effect on the insulation may be inhibited by periodically reversing the polarity and employing the rectifier apparatus 5 to insure that current of the proper polarity is supplied to the tubes.

The mechanical features of the repeater station are illustrated in Fig. 2. The station comprises a water-tight steel shell 6 suspended at a depth of 500 to 1000 feet from a buoy 7 which serves both as a support and as a marker to assist in locating the station for servicing. The incoming and outgoing cable sections 1 are led into the shell in any desired manner as, for example, through a water-tight stuffing box such as is disclosed in W. S. Gorton Patent No. 1,610,442 issued December 14, 1926. The incoming and outgoing cable sections may be included in one armor structure thus forming for mechanical purposes a single cable between the repeater station and the sea bottom.

As an additional safe-guard against leaks, the whole container may, if desired, be covered with a sheath of lead. The connecting cable core may also be covered from the container to a point at some distance. The assembly cover of the container may be provided with wiped joints thus insuring that the container as a whole and the connecting cable for some distance from it is sealed in a continuous lead sheath.

The shell 6 may be anchored by means of the friction of the communication cable sections 1 on the bottom of the sea but in some locations it may be preferable to attach supplemental anchor chains and anchors 8. The communication cables and anchoring cables may in effect be combined by attaching an anchor to the communication cable itself and dispensing with the separate anchor cable.

The shell is braced internally in any desired fashion to resist pressure. If desired, it may be of the cylindrical elongated shape shown in U. S. Patent to Bowlsby 52,522 issued February 13, 1866 to facilitate hoisting to the deck of a ship. It is preferably filled with air under pressure to strengthen the casing and to prevent leaks. The necessary air is preferably stored at high pressure in tanks 9 and arranged to be released automatically in order to keep the pressure within the repeater casing 6 constant or even to increase the pressure if leakage should occur. The constant pressure condition may be attained by a valve 10 of well-known type which is arranged to open whenever the atmospheric pressure inside the shell is below certain magnitude. When leakage occurs water accumulates in the sump 11 and operates the float 12 which in turn opens valve 13 to increase the pressure within the shell. A container of a chemical substance as, for example, sodium peroxide Na₂O₂ which releases oxygen when in contact with water may also be provided. When the water in the sump rises to the level of the opening 14 in the chemical container 15, oxygen is released as long as the water remains at that level.

The supporting buoy 7 may be of any well-known type. It may be provided with a rubber covering or with rubber bumpers to prevent damage from icebergs. The cable 16 by which the repeater station is supported from the buoy should be extensible in order to avoid transmission of the motion of the buoy to the repeater station. It must also provide great resistance to wear in itself and at the points of connection to the repeater station and the buoy. A resilient and extensible structure resistant to wear is furnished by a chain 17 wholly embedded in rubber 18, as shown in detail in Fig. 3. The links of the chain are of a flat cross section and are so spaced that when under tension there is a considerable thickness of rubber between them. The rubber is treated so as not to be adversely affected by prolonged immersion in sea water as, for example, according to the disclosure of British Patent No. 223,644. The rubber is preferably vulcanized to the metal links of the chain 17.

This structure holds some of the rubber under compression and some under tension. The chain, the links of which consist of high tensile strength steel, furnishes security against rupture of the connection.

In lieu of the chain a helical spring 19 wholly embedded in rubber as indicated in Fig. 4 or a wire rope 20 embedded therein as in Fig. 5 may be employed. Fig. 6 discloses another modification in which a combination of chain and spring is used, the spring surrounding the chain.

Weights may be placed upon the extensible supporting cable 16 to diminish the force on the repeater station due to the motion of the mark buoy 7. Such a structure is a mechanical analogue of the low pass electrical filter. In view of the very low frequency (0.1 to 0.05 cycle per second) of oceanic storm waves large masses and very extensible connections are required in order to obtain the desired filtering effect. The masses necessary can best be realized by attaching to the extensible connection large discs as shown at 21 in Fig. 2. These discs can be constructed so as to have little net weight in the water (thus putting only a small burden on the supporting buoy) but to have a large effective mass, due to the water that moves with them, and to cause a large dissipation of energy in their motion. The largest dissipation of energy is secured by making any edges in the structure of the disc sharp. The discs will be subject to the motion of the water due to waves but this motion is attenuated with increasing depth so that the resulting force which acts on the repeater station is less than would be the case if there were no discs on the extensible connection.

The lowermost disc 22 is made considerably larger than the others so that it serves to a considerable extent as a sea anchor and the connection 23 between this larger disc and the repeater station is much more extensible than the connections to the other discs and the supporting buoy so as to insulate the station more effectively from the motion of the buoy. Each disc is provided with rigid connecting portions 24 which insure that the discs assume positions perpendicular to the run of the supporting cable 16 so as to exert a maximum effect.

The communication cable sections 1 may be loaded or non-loaded. If the sections connecting repeater stations are loaded, those portions from the repeater station to the bottom may be non-loaded.

The portions of the cable connecting the mark buoy with the sea bottom may have smaller conductors and more armor in proportion than is usual in deep sea cable practice.

If excessive interference between the outgoing and incoming cables entering a repeating station is encountered the return circuits of the cables between the repeater station and bottom may be loaded as disclosed in British Patent 359,564.

The communication cables may have one layer of armor and may be allowed to untwist before fastening to the repeater station or each cable section may have two layers of armor with crossed lays as disclosed in U. S. Patent 1,738,234 issued December 3, 1929 to A. M. Curtis.

What is claimed is:

1. A submerged repeating station comprising a buoy, a supporting cable extending downwardly therefrom to a depth of 500 to 1000 feet, a water-tight shell connected to the lower end of said supporting cable and supported thereby, communication apparatus therein, the buoy, the shell and the supporting cable together having a net positive buoyancy whereby a portion of the buoy always remains visible above the surface of the sea, and means anchoring said shell with respect to the sea bottom.

2. A submerged sea repeater station comprising a water-tight casing, repeating apparatus therein and means for supporting said casing from the surface of the sea and for maintaining said casing in a floating condition submerged at approximately a fixed distance below the surface of the sea and substantially free from surface motions.

3. In combination, a buoy, a water-tight chamber and an extensible supporting member connecting said chamber to said buoy to support said chamber at a fixed distance below the buoy and maintaining said chamber substantially free from surface wave motions to which said buoy is subjected.

4. In combination, a supporting buoy, a structure suspended therefrom and means connecting said buoy and said structure comprising an extensible cable having stabilizing members with large surfaces connected thereto at intervals, said surfaces extending perpendicularly to said cable whereby motions of the buoy are substantially filtered out by said cable and are not transmitted to said structure.

5. A repeater comprising a water-tight casing, repeating apparatus therein, means for lowering said casing into the sea to a depth at which the pressures encountered are of the order of 250 pounds per square inch, and means within said casing to increase the atmospheric pressure therein when water leaks into said casing.

6. An ocean cable repeating station comprising a supporting means, a casing, a cable connecting said casing to said supporting means whereby the casing may be supported in a submerged condition in the sea, repeating apparatus in said casing of a nature such that it would be adversely affected by contact with water and mounted at some distance above the bottom of the casing, and means within the casing responsive to the presence of water in the casing to increase the atmospheric pressure within the casing to tend to exclude entry of water.

7. A transmission system comprising conductor sections each having a length of the order of several miles, the sections being arranged in tandem to constitute a transmitting path, means comprising a repeater connecting each terminal section to an adjacent section and connecting each other section to two adjacent sections, a source of uni-directional power current for the repeaters at the end of a terminal section, said source being connected to the terminal section to transmit power current over the transmitting path to the repeaters, and means connecting each repeating station to the adjacent cable sections to supply power current from said sections to the repeating station, said means including an asymmetric path which insures that the polarity of the current applied to the repeating station remains unchanged irrespective of the polarity of the power current supply means at the terminal section.

8. A transmission system comprising terminal stations, a plurality of sections of cable arranged in tandem therebetween, repeating stations connecting the contiguous ends of adjacent cable sections to form a unitary communication system, means for transmitting uni-directional power current from a terminal station over a plurality of said cable sections to a remote repeating station, each of the intervening repeating stations comprising a path which freely transmits power current between adjacent cable sections while at the same time substantially suppressing currents of the frequencies involved in communication, and asymmetric power conducting means connecting each repeating station to the adjacent cable sections to permit power current to be transmitted from said sections to the repeating station and to insure that the polarity of the current applied to the repeating station is unaffected by reversals of polarity of the power current on the cable sections.

9. A deep sea cable system comprising cable sections, a submerged repeating station having a vacuum tube amplifier connected between two adjacent sections to receive weak communication currents from one of said adjacent sections and to amplify said communication currents and supply the amplified currents to said other adjacent section, means at a shore terminal of one of said sections to supply thereto power current for energizing the vacuum tube amplifier and communication currents, and means connecting a vacuum tube amplifier at the submerged repeating station to the adjacent cable sections to supply power current from said sections to said amplifier, said means including an asymmetric path which insures that the polarity of the current applied to the amplifier remains unchanged irrespective of the polarity of the power current supply means at the shore terminal.

10. A buoy, a supporting cable attached thereto at one end and a supported structure connected to said cable at its other end, said cable comprising a chain embedded in resilient material and having its links separated by spaces filled with the material.

11. A repeater for deep sea cables comprising a water-tight container enclosing repeating apparatus having input terminals for receiving weak communication currents from an adjacent cable section connected thereto and having output terminals for impressing amplified communication currents upon a second adjacent cable section connected thereto and means comprising a buoy having sufficient positive buoyancy to support said container, and a supporting cable connected at one end to said buoy and at its other end to the container for supporting said container in floating condition at approximately a constant depth below the surface of the sea irrespective of ocean currents.

12. A buoy, a submerged mass and a cable connected to said buoy and to said mass, said cable comprising a resilient extensible body and a member of sufficient tensile strength to support said mass passing through said body, said member having considerable slack length within the resilient extensible body so that it does not undergo high tensional strains until after said extensible body has undergone a substantial extension.

13. A deep sea cable system comprising shore terminal stations, a plurality of sections of deep sea cable, said cable sections being connected in tandem to form a unitary communication system, submerged repeating stations connecting adjacent ends of said cable sections at sea, means for transmitting power from a shore station over said cable sections to a remote submerged repeater station, each of the intervening submerged stations comprising a path which freely transmits power current between adjacent cable sections while at the same time substantially suppressing currents of the frequencies involved in communication, and asymmetric conducting means connecting each repeating station to the adjacent cable sections to permit power current to be transmitted from said sections to the repeating station and to insure that the polarity of the current as applied to the repeating station is not reversed whenever a reversal of polarity of the applied power at the shore station occurs.

14. A submerged repeating station comprising a water-tight shell including communication apparatus therein, a supporting cable of from 500 to 1000 feet in length having one end fixed to the shell, and a supporting buoy fixedly connected to the other end of the supporting cable and having a positive buoyancy sufficient to support the shell whereby the shell may be maintained supported in a submerged condition in the sea in a zone substantially free from sea-surface motions at a depth of from 500 to 1000 feet below the level of the surface of the sea.

15. A repeating station according to claim 1 having in combination means for protecting the water-tight shell from the motions which occur at the surface of a body of water in which said shell is submerged, and means for insuring that the shell is not subjected to pressures which are in excess of 500 pounds per square inch.

16. A repeater comprising a water-tight casing, repeating apparatus for repeating electric signal current variations, means for lowering said casing into the sea and for externally supporting the casing when lowered, and means within said casing to increase the quantity of gaseous material in the internal atmosphere of the casing in response to introduction of water within the casing.

WILLIAM S. GORTON.